United States Patent [19]
Yahagi

[11] Patent Number: 5,832,383
[45] Date of Patent: Nov. 3, 1998

[54] MOBILE COMMUNICATION METHOD AND SYSTEM

[75] Inventor: Masahiko Yahagi, Tokyo, Japan

[73] Assignee: NEC Corporation, Tokyo, Japan

[21] Appl. No.: 574,698

[22] Filed: Dec. 19, 1995

[30] Foreign Application Priority Data

Dec. 19, 1994 [JP] Japan ................................. 6-315064

[51] Int. Cl.⁶ ................................................. H04Q 7/20
[52] U.S. Cl. .......................... 455/445; 455/432; 455/436
[58] Field of Search .................................. 455/428, 432, 455/433, 435, 436, 439, 445, 458

[56] References Cited

U.S. PATENT DOCUMENTS

| | | | |
|---|---|---|---|
| 5,153,902 | 10/1992 | Buhl et al. | 455/432 |
| 5,278,890 | 1/1994 | Beeson, Jr. et al. | 455/433 |
| 5,315,637 | 5/1994 | Breeden et al. | 455/445 |
| 5,357,561 | 10/1994 | Grube | 455/432 |
| 5,402,471 | 3/1995 | Van Nielen | 455/445 |
| 5,438,609 | 8/1995 | Yahagi | 455/458 |
| 5,442,683 | 8/1995 | Hoogeveen | 455/445 |
| 5,490,203 | 2/1996 | Jain et al. | 455/445 |
| 5,550,896 | 8/1996 | Chavez, Jr. | 455/436 |

FOREIGN PATENT DOCUMENTS 58-47341  3/1983  Japan .

OTHER PUBLICATIONS

A. Nakajima et al., "Signaling Protocol Architecture for A Digital Mobile Communications Network", The 11, *Transactions of the Institute of Electronics, Information and Communication Engineers*, B–II, vol. J73–B–II, No. pp. 581–584, (Nov. 1990).

K. Kinoshita, "System and Network Technologies", *The Transactions of the Institute of Electronics, Information and Communication Engineers*, vol. 73, No. 8, pp. 812–818, (Aug. 1990).

*Primary Examiner*—Dwayne D. Bost
*Assistant Examiner*—Nay Maung
*Attorney, Agent, or Firm*—Foley & Lardner

[57] ABSTRACT

In a mobile communication method, when a terminating call to a mobile station is generated, one of subscriber lines which is connected to a local switch and assigned to the mobile station is captured. A mobile station identification number defined in correspondence with the captured subscriber line is retrieved by using a physical or logical address of the captured subscriber line as a parameter. The mobile station is called through at least one base station by using the retrieved mobile station identification number. The terminating call is connected to the mobile station in accordance with a response from the mobile station with respect to calling. A mobile communication system is also disclosed.

17 Claims, 9 Drawing Sheets

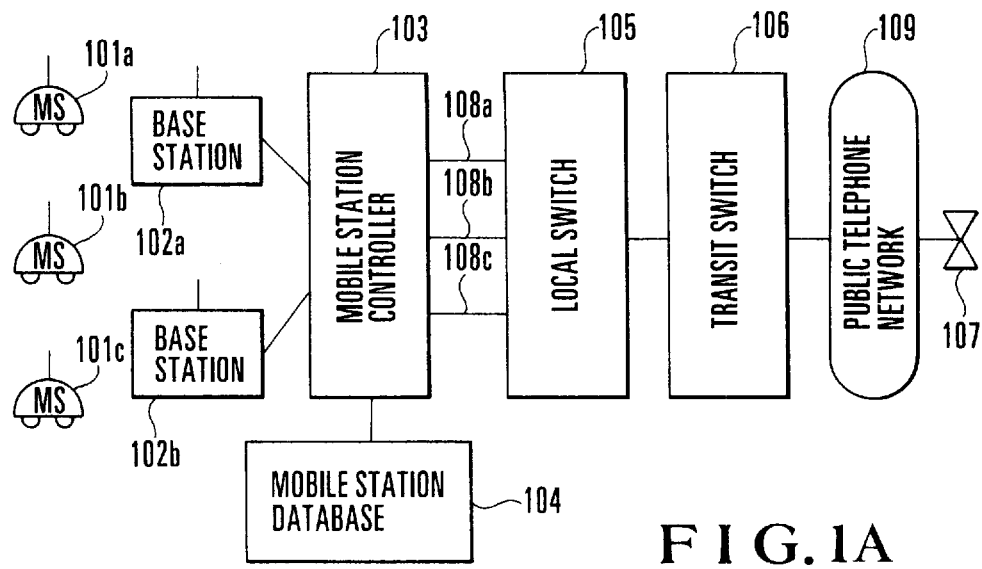
F I G. 1A
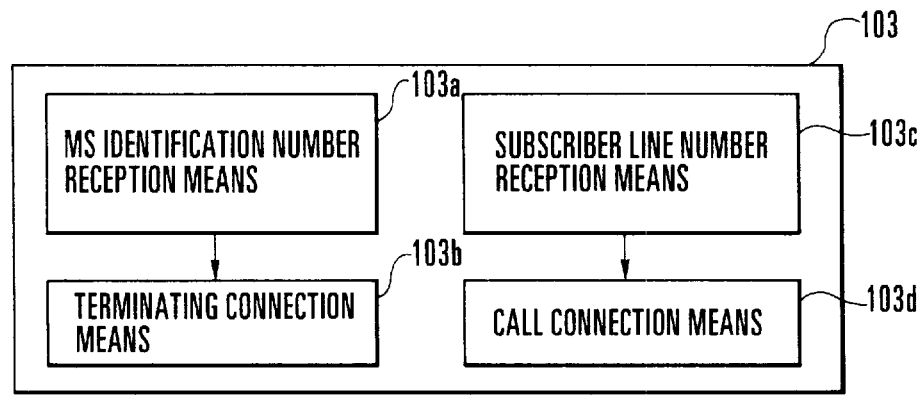
F I G. 1B
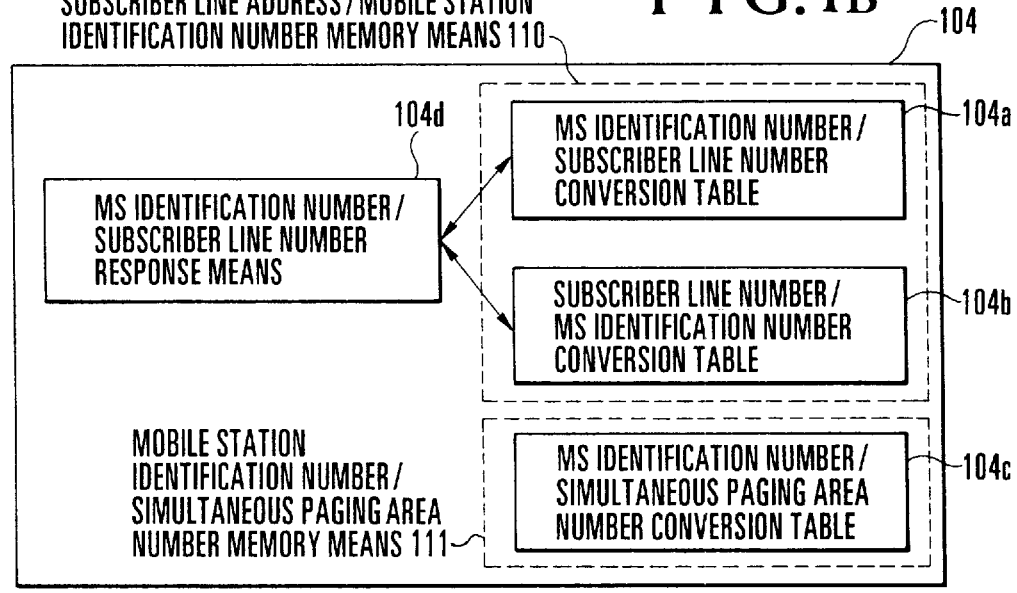
F I G. 1C

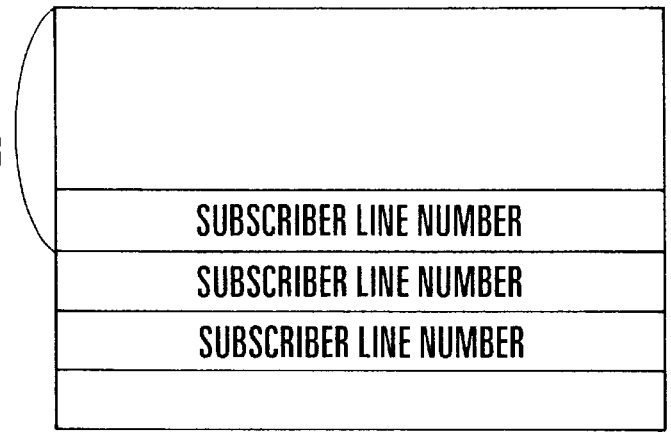
F I G. 4
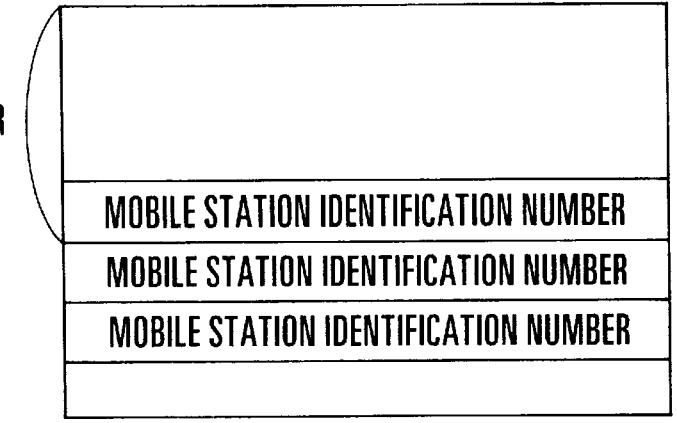
F I G. 5
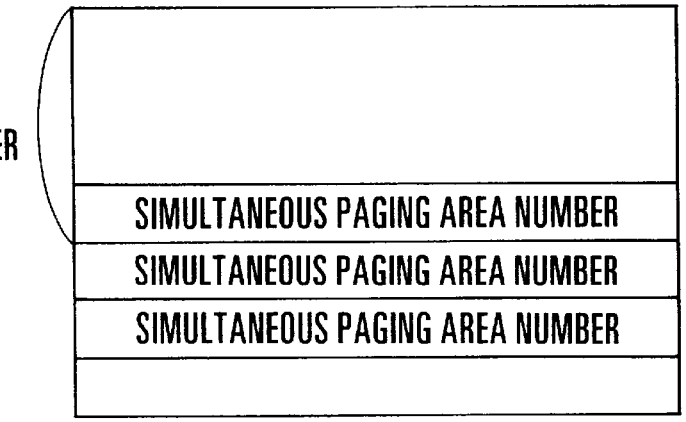
F I G. 6

MOBILE COMMUNICATION METHOD AND SYSTEM

BACKGROUND OF THE INVENTION

The present invention relates to a mobile communication method and apparatus and, more particularly, to a call connection method and apparatus for mobile stations.

In a conventional mobile communication system of this type, a unit having a call connection function for mobile stations is connected to a unit of a rank equivalent to that of a transit switch to realize call connection of the mobile stations. One such conventional system is as disclosed in "Signaling Protocol Architecture for a Digital Mobile Communications Network" (THE TRANSACTIONS OF THE INSTITUTE OF ELECTRONICS, INFORMATION AND COMMUNICATION ENGINEERS, 1990/11, Vol. J73-B-II, No. 11, pp. 571–584 (to be referred to as reference 1 hereinafter)) and "System and Network Technologies" ("Technologies for Supporting Digital Automobile Telephones", THE TRANSACTIONS OF THE INSTITUTE OF ELECTRONICS, INFORMATION AND COMMUNICATION ENGINEERS, 1990/8, Vol. 73, No. 8, pp. 812–818 (to be referred to as reference 2 hereinafter)).

In another mobile communication system, a mobile control office is arranged below the rank of an end office on a switching stage, and the same interface conditions as those of ordinary telephones in a public telephone network are set between the mobile control office and the end office, as disclosed in "Mobile Communication System" (Japanese Patent Laid-Open No. 58-47341 (to be referred to as reference 3 hereinafter)). According to this mobile communication system, when a mobile station generates an originating call, one of a plurality of communication paths to the end office which is in an idle state is captured to close a DC loop (corresponding to an on-hook operation of an ordinary telephone set). At the same time, a dial number received from the mobile station is converted into a dial pulse or a PB signal to be sent to the end office. With this operation, call connection is performed.

FIG. 10 shows the network architecture of the conventional digital automobile telephone system disclosed in reference 2. Referring to FIG. 10, reference numeral 1 denotes an ISDN (Integrated Services Digital Network) having zone centers ZC; and 2 and 3, automobile telephone networks connected to the ISDN 1 and designed to perform call connection of mobile stations MS. Each of the automobile telephone networks 2 and 3 is constituted by a gateway mobile communication center (to be referred to as a gateway center hereinafter) G-MCC connected to a corresponding zone center ZC and having gate and transit functions with respect to the ISDN 1, a home location register HLR in which the numbers and visited areas of the mobile stations MS are registered, a visited mobile communication center (to be referred to as a visited center) V-MCC having visited area management and station connection functions, and a radio base station BS for transmitting/receiving signals to/from the mobile stations MS. Reference numeral 4 denotes a packet network connected to the ISDN 1; 5, an analog telephone network connected to the ISDN 1; and 6 and 7, fixed telephone sets respectively connected to the analog telephone network 5 and the ISDN 1. Call connection between switching systems such as the gateway centers G-MCC and the visited centers V-MCC is performed by a switching system protocol of the common channel signaling system indicated by the dotted lines in FIG. 10, in which a control signal path is separated from communication paths.

FIG. 11 shows the conventional mobile communication system disclosed in reference 3, which is characterized in that a mobile control office 14 is arranged below the rank of an end office EO on a switching stage, and the same interface conditions as those of ordinary telephones in a public telephone network are set between the mobile control office 14 and the end office EO. In this arrangement, the mobile control office and the end office EO are connected to each other in the same manner as in the case of ordinary fixed telephone sets. When a mobile station 16 generates an originating call, one of a plurality of communication paths to the end office EO which is in an idle state is captured, and the end office EO is started. When a terminating call is to be received by the mobile station 14, the end office EO performs a terminating operation with respect to the mobile control office 14 by using one of a plurality of lines, indicated by representative numbers, which is in an idle state. Reference numeral 11 denotes an ordinary telephone set; 12 and 13, mobile control centers; and 15, a radio base station. Reference symbol TC denotes a toll center.

According to the above mobile communication system disclosed in reference 1, signals unique to a mobile network are exchanged between the visited center V-MCC having the service area in which the mobile station MS is present, and an office unit equivalent to the conventional gateway center G-MCC for performing connection processing with respect to a public telephone network. For this reason, a unit equivalent to the visited center V-MCC and a unit equivalent to the gateway center G-MCC need to have functions different from those of units used in the public telephone network, i.e., switching systems. That is, a mobile telephone network different from a public telephone network is required to realize a mobile communication function.

According to the mobile communication system disclosed in reference 3, since the mobile control office 14 and the end office EO are connected to each other through the same interface as that for an ordinary fixed telephone set, the end office EO need not transmit/receive signals unique to a mobile network to/from the toll center TC. An end office in a public telephone network can therefore be used. In the end office EO, however, the respective lines cannot be related to mobile stations because of the method of capturing a line in an idle state between the end office EO and the mobile control office 14 every time a mobile station performs an originating or terminating operation. For this reason, the end office EO cannot perform call control as an additional service, e.g., terminating transfer, which needs different control operations for the respective mobile stations. Call control as an additional service must therefore be performed by a unit such as the mobile control office 14 other than the end office EO.

SUMMARY OF THE INVENTION

It is an object of the present invention to provide a mobile communication method and system in which a local switch can realize general call connection processing for a mobile station and call connection processing which can be determined and controlled by the local switch.

In order to achieve the above object, according to the present invention, there is provided a mobile communication method comprising the steps of when a terminating call to a mobile station is generated, capturing one of subscriber lines which is connected to a local switch and assigned to the mobile station, retrieving a mobile station identification number defined in correspondence with the captured subscriber line by using a physical or logical address of the captured subscriber line as a parameter, calling the mobile station through at least one base station by using the retrieved mobile station identification number, and connecting the terminating call to the mobile station in accordance with a response from the mobile station with respect to calling.

BRIEF DESCRIPTION OF THE DRAWINGS

FIG. 1A is a block diagram showing the system configuration of a mobile communication system according to an embodiment of the present invention;

FIGS. 1B and 1C are block diagrams respectively showing the arrangements of a mobile station controller 103 and a mobile station database 4;

FIG. 4 is a view showing an MS identification number/subscriber line number conversion table 104a of the mobile station database 104 in FIG. 1A;

FIG. 5 is a view showing a subscriber line number/MS identification number conversion table 104b of the mobile station database 104 in FIG. 1A;

FIG. 6 is a view showing an MS identification number/simultaneous paging area number conversion table 104c of the mobile station database 104 in FIG. 1A;

DESCRIPTION OF THE PREFERRED EMBODIMENT

Figure 2:
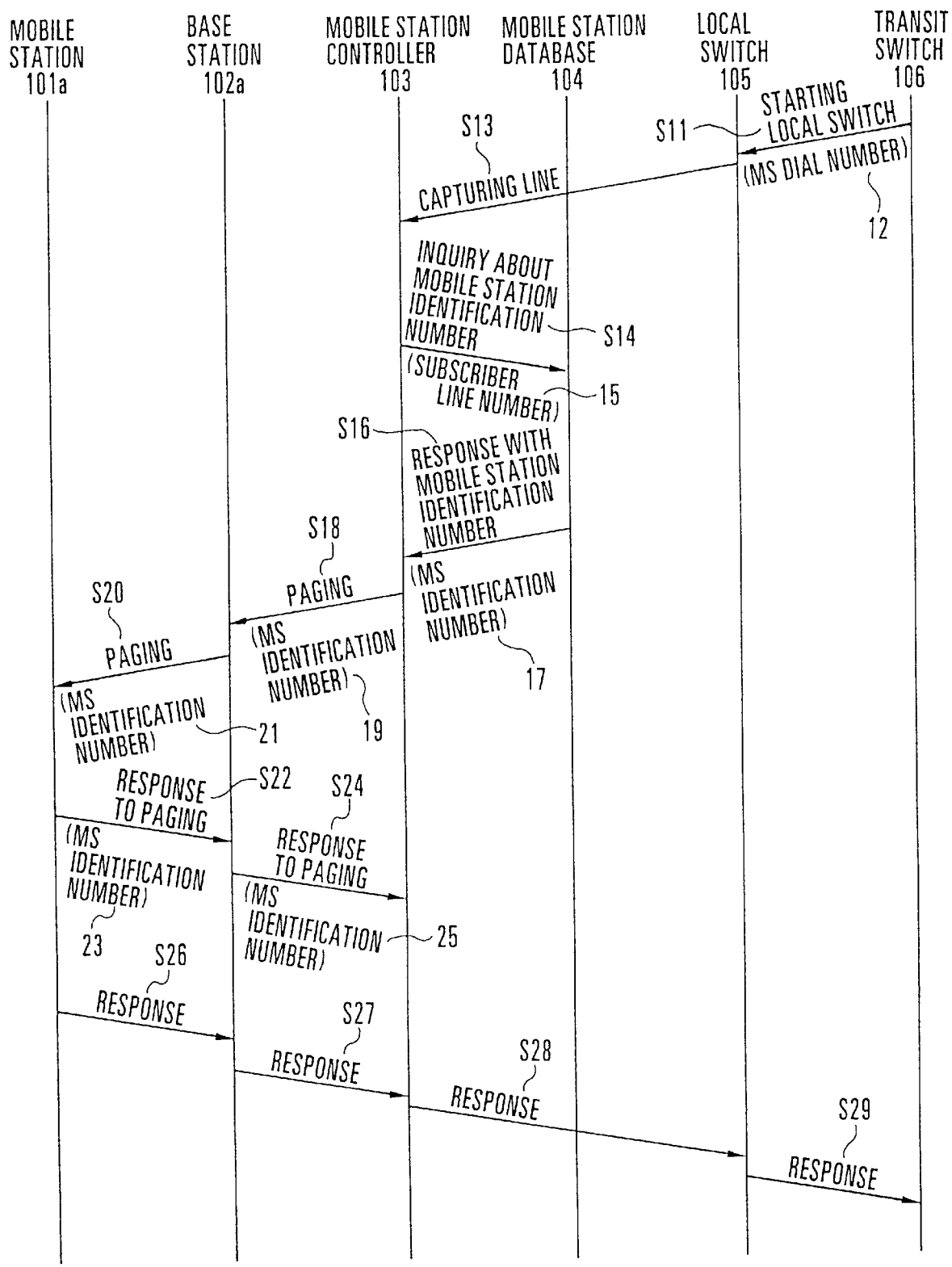
FIG. 2 is a chart showing a terminating sequence for a mobile station in the mobile communication system in FIG. 1A.

An embodiment of the present invention will be described next with reference to the accompanying drawings.

FIG. 1A shows the system configuration of a mobile communication system according to an embodiment of the present invention. FIGS. 1B and 1C respectively show the arrangements of a mobile station controller 103 and a mobile station database (MDB) 104.

Referring to Fig. 1A, each of mobile stations (MSs) 101a, 101b, and 101c has a function of establishing communication with base stations (BSs) 102a and 102b by radio communication. The base stations 102a and 102b are connected to the mobile station controller 103. In addition to the base stations 102a and 102b, the mobile station controller 103 is connected to the mobile station database 104 and a local switch (LS) 105 of a public telephone network. Subscriber lines 108a, 108b, and 108c are connected between the mobile station controller 103 and the local switch 105. Terminating dial numbers defined in the local switch 105 are respectively assigned to the subscriber lines 108a to 108c. The local switch 105 is connected to a fixed telephone set 107 via a transit switch 106 and a public telephone network 109.

As shown in FIG. 1C, the mobile station database 104 includes an MS identification number/subscriber line number conversion table 104a for converting the MS identification numbers of the mobile stations 101a to 101c, which are defined in correspondence with the subscriber lines 108a to 108c, into subscriber line numbers, a subscriber line number/MS identification number conversion table 104b for converting subscriber line numbers into MS identification numbers, an MS identification number/simultaneous paging area number conversion table 104c for converting MS identification numbers into a simultaneous paging area number, and an MS identification number/subscriber line number response means 104d which responds to an inquiry from the mobile station controller 103 upon referring to the MS identification number/subscriber line number conversion table 104a and the subscriber line number/MS identification number conversion table 104b.

Upon reception of an inquiry using the physical or logical addresses of the subscriber lines 108a to 108c as parameters, the MS identification number/subscriber line number response means 104d responds with the MS identification numbers of the mobile stations 101a to 101c, which are defined in correspondence with the subscriber lines 108a to 108c, upon referring to the subscriber line number/MS identification number conversion table 104b. Upon reception of an inquiry using the MS identification numbers of the mobile stations 101a to 101c as parameters, the MS identification number/subscriber line number response means 104d responds with the subscriber line numbers of the subscriber lines 108a to 108c which correspond to the mobile stations 101a to 101c upon referring to the MS identification number/subscriber line number conversion table 104a.

Note that the MS identification number/subscriber line number conversion table 104a and the subscriber line number/MS identification number conversion table 104b constitute a subscriber line address/mobile station identification number memory means 110, and the MS identification number/simultaneous paging area number conversion table 104c constitutes a mobile station identification number/simultaneous paging area number memory means 111.

As shown in Fig. 1B, the mobile station controller 103 includes an MS identification number reception means 103a, a terminating connection means 103b, a subscriber line number reception means 103c, and a call connection means 103d. When the subscriber lines 108a to 108c are captured by the local switch 105, the MS identification number reception means 103a notifies the mobile station database 104 of the subscriber line numbers of the captured subscriber lines 108a to 108c, and receives the MS identification numbers of the mobile stations 101a to 101c related to the subscriber lines 108a to 108c. The terminating connection means 103b calls one or more base stations 102a and 102b connected to the mobile station controller 103, and performs terminating connection of the mobile stations 101a to 101c. Upon reception of an originating request from one of the mobile stations 101a to 101c through one of the base stations 102a and 102b, the subscriber line number reception means 103c notifies the mobile station database 104 of the MS identification number of an originating mobile station of the mobile stations 101a to 101c, and receives the subscriber number of one of the subscriber lines 108a to 108c which corresponds to the originating mobile station. The call connection means 103d selects one of the subscriber lines 108a to 108c between the mobile station controller 103 and the local switch 105 by using the received subscriber line number, and starts an originating operation, thereby performing call connection between one of the mobile stations 101a to 101c and the terminating mobile station designated thereby.

By designating and starting a terminating operation from the fixed network side, the local switch 105 can connect the mobile station controller 103 to this terminating dial number through the same procedure as that for a terminating call to an ordinary fixed telephone set. In addition, the subscriber lines 108a, 108b, and 108c are respectively assigned to the mobile stations 101a, 101b, and 101c, and call connection to the mobile station 101a is performed via the subscriber line 108a. Similarly, call connection to the mobile station 101b and call connection to the mobile station 101c are performed via the subscriber lines 108b and 108c, respectively. When a terminating call is to be received by one of the mobile stations 101a to 101c, the mobile station database 104 receives an inquiry from the mobile station controller 103 and responds with the MS identification number of the corresponding one of the mobile stations 101a to 101c in accordance with the address of a corresponding one of the subscriber lines 108a to 108c. When an originating call is generated by one of the mobile stations 101a to 101c, the mobile station database 104 receives an inquiry from the mobile station controller 103 and responds with the subscriber line number of a corresponding one of the subscriber lines 108a to 108c in accordance with the MS identification number of the corresponding one of the mobile stations 101a to 101c.

FIG. 2 shows a terminating connection sequence in which the transit switch 106 terminates connection with respect to the mobile station 101a.

Upon reception of a start signal from the public telephone network 109, the transit switch 106 specifies the local switch 105 in accordance with an MS dial number contained in the start signal, and starts the local switch 105 by using an MS dial number 12 as a parameter (step S11). The local switch 105 captures one of the subscriber lines 108a to 108b connected to the mobile station controller 103 in accordance with the received MS dial number 12 (step S13). When one of the subscriber lines 108a to 108c is captured by the local switch 105, the mobile station controller 103 sends an MS identification number inquiry signal to the mobile station database 104 by using a subscriber line number 15, of the captured subscriber line, which is stored in the mobile station controller 103 (step S14). The MS identification number/subscriber line number response means 104d of the mobile station database 104 searches the subscriber line number/MS identification number conversion table 104b to read out an MS identification number 17 corresponding to the inquired subscriber line number 15, and returns an MS identification number response signal to the mobile station controller 103 by using the MS identification number 17 as a parameter (step S16). Upon reception of the MS identification number response signal through the MS identification number reception means 103a, the mobile station controller 103 causes the terminating connection means 103b to extract an MS identification number 19 contained in the response signal, and sends a paging signal to the base station 102a by using the extracted MS identification number 19 as a parameter to call the mobile station 101a (step S18). Upon reception of the paging signal, the base station 102a sets the MS identification number 19, contained in the received paging signal, as a parameter, i.e., an MS identification number 21, for a paging signal for calling the mobile station 101a, and sends the paging signal (step S20). Upon reception of a paging response signal containing an MS identification number 23 from the mobile station 101a (step S22), the base station 102a extracts the MS identification number 23 contained in the signal, sets the MS identification number 23 as a parameter, i.e., an MS identification number 25, for a paging response signal with respect to the mobile station controller 103, and transfers the resultant signal to the mobile station controller 103 (step S24). When the mobile station 101a performs an off-hook operation, a response signal is sent to the base station 102a (step S26) and is transferred to the mobile station controller 103 (step S27). The signal is then transferred to the local switch 105 (step S28). With this operation, the local switch 105 recognizes a paging response at the same time the mobile station 101a performs an off-hook operation in response to a terminating operation started by the fixed telephone set 107. The local switch 105 then connects a line and starts to perform charging processing. The local switch 105 sends a response signal to the transit switch 106 (step S29).

Figure 3:
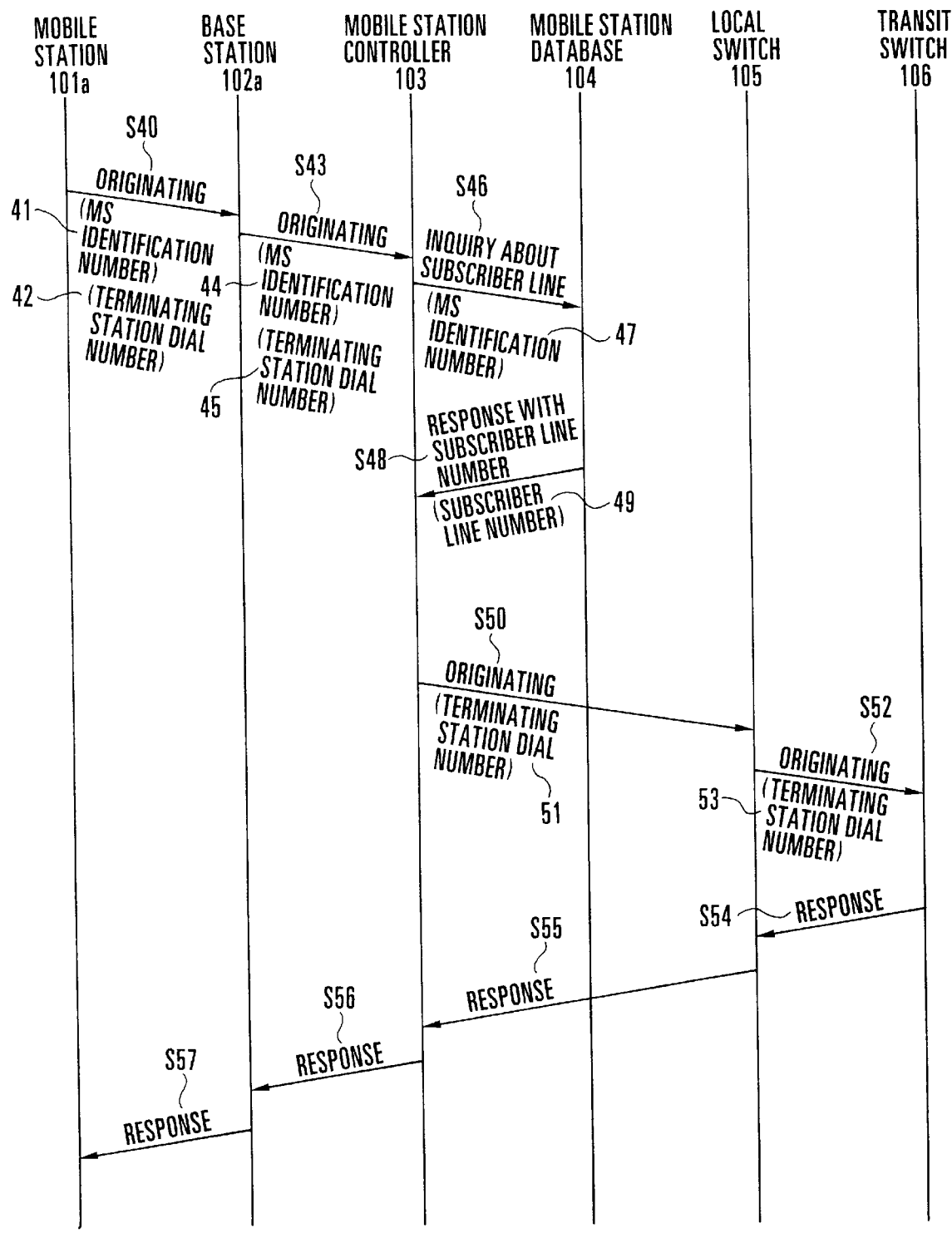
FIG. 3 is a chart showing an originating sequence for a mobile station in the mobile communication system in FIG. 1A.

FIG. 3 shows a connection sequence in which one of the mobile stations 101a to 101c generates an originating call in the mobile communication system in FIG. 1A.

Upon generating an originating call, the mobile station 101a sets a self-MS identification number 41 and a designated terminating station dial number 42 as parameters for the originating call to the base station 102a (step S40). The base station 102a sends the MS identification number 41 and the terminating station dial number 42 as an MS identification number 44 and a terminating station dial number 45 to the mobile station controller 103 (step S43). Upon reception of this originating call, the mobile station controller 103 sends a subscriber line inquiry signal to the mobile station database 104 by using an MS identification number 47 as a parameter to inquire about a subscriber line number corresponding to the mobile station 101a (step S46). The MS identification number/subscriber line number response means 104d of the mobile station database 104 searches the MS identification number/subscriber line number conversion table 104a on the basis of the MS identification number 47 contained in the received subscriber line inquiry signal to read out a subscriber line number 49 corresponding to the mobile station 101a, and returns it to the mobile station controller 103 (step S48). The subscriber line number reception means 103c of the mobile station controller 103 receives this number. The call connection means 103d selects one of the subscriber lines 108a to 108c which is indicated by the received subscriber line number 49, and starts the local switch 105 by using, as a terminating station dial number 51, the terminating station dial number 45 from the base station 102a which is designated by the mobile station 101a (step S50). The above procedure in which the mobile station controller 103 starts the local switch 105 is the same as that for starting the local switch 105 when a fixed telephone set generates an originating call. Upon reception of an originating call containing a terminating station dial number 53 from the local switch 105 (step S52), the transit switch 106 performs terminating connection in accordance with the terminating station dial number 53 (not shown). When the transit switch 106 receives a response signal transmitted from a terminating station, e.g., the fixed telephone set 107 afterward, the transit switch 106 transfers this signal to the local switch 105 (step S54). The local switch 105 transfers the signal to the mobile station controller 103 (step S55) and is transferred to the base station 102a and the mobile station 101a (steps S56 and S57). As a result, the mobile station 101a starts speech communication with the terminating station.

FIG. 4 shows the arrangement of the MS identification number/subscriber line number conversion table 104a in FIG. 1C. In performing mainly call connection of one of the mobile stations 101a to 101c when it generates an originating signal, the mobile station controller 103 is used to select one of the subscriber lines 108a to 108c so as to start the local switch 105.

FIG. 5 shows the arrangement of the subscriber line number/MS identification number conversion table 104b in FIG. 1C. Upon mainly receiving a terminating call from the local switch 105 to one of the mobile stations 101a to 101c, the mobile station controller 103 is used to read out an MS identification number used to determine a specific one of the mobile stations 101a to 101c to which a captured one of the subscriber lines 108a to 108c corresponds, i.e., to perform terminating connection with respect to the corresponding one of the mobile stations 101a to 101c.

FIG. 6 shows the arrangement of the MS identification number/simultaneous paging area number conversion table 104c in FIG. 4C which is used to obtain a simultaneous paging area where the mobile stations 101a to 101c are present when the base stations 102a and 102b connected to the mobile station controller 103 are divided into a plurality of simultaneous paging areas. Upon reception of a terminating call to each of the mobile stations 101a to 101c, the mobile station controller 103 further starts the mobile station database 104 by using obtained MS identification numbers as parameters to specify a simultaneous paging area where the mobile stations 101a to 101c are present. The mobile station database 104 searches the MS identification number/simultaneous paging area number conversion table 104c by using the MS identification numbers, and converts the MS identification numbers into a simultaneous paging area number. The mobile station database 104 then returns this number to the mobile station controller 103. The mobile station controller 103 sends a mobile station call signal to one of the base stations 102a and 102b within the simultaneous paging area by using the simultaneous paging area number.

Figure 7:
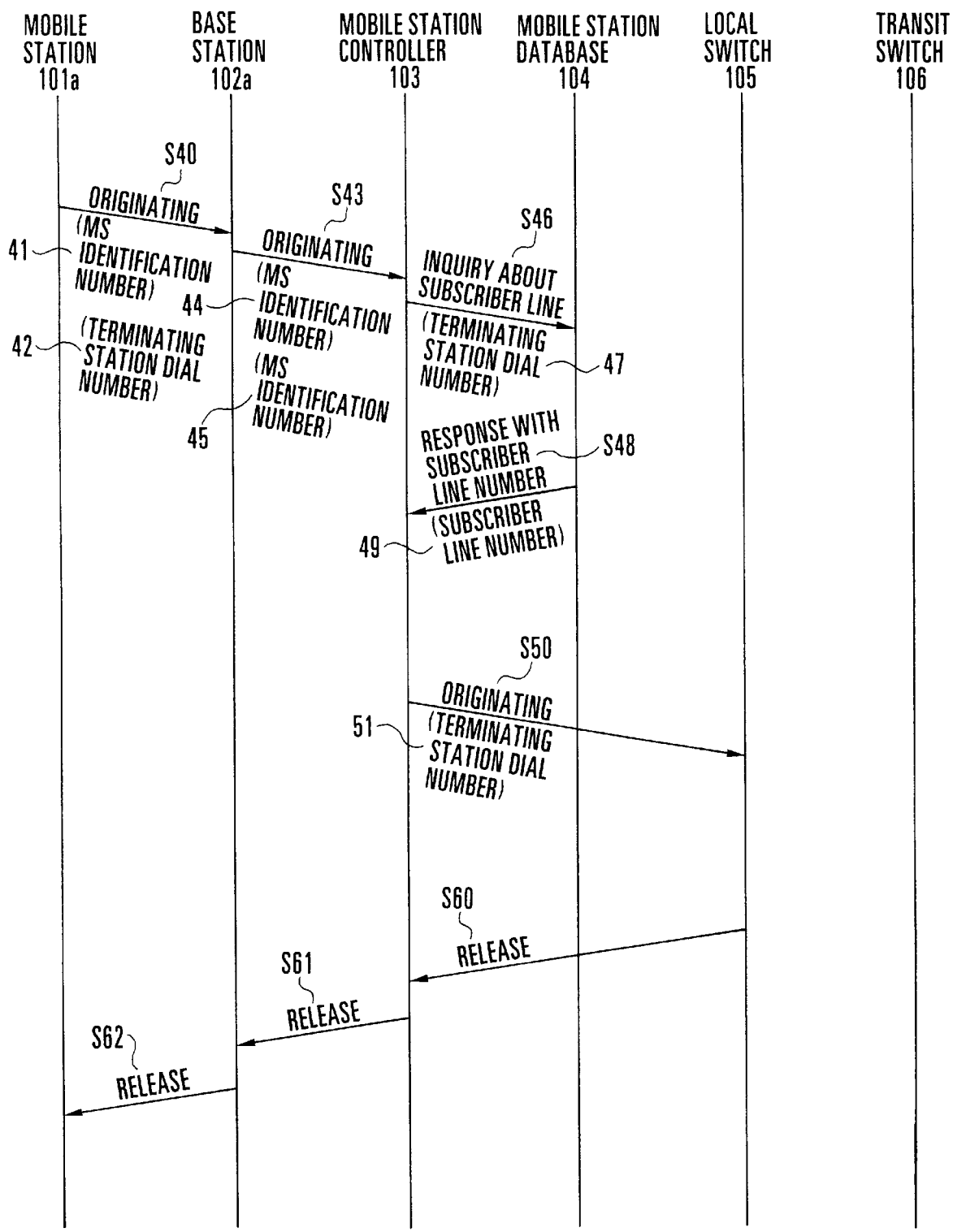
FIG. 7 is a chart showing an originating sequence in which a terminating station dial number designated by a mobile station is invalid in the mobile communication system in FIG. 1A.

FIG. 7 shows a connection sequence in which the mobile station 101a generates an originating call, and the terminating station dial number is the number of a mobile station which does not actually exist in the mobile communication system in FIG. 1A.

Referring to FIG. 7, the sequence between the instant (step S40) at which the mobile station 101a sends an originating signal to the base station 102a and the instant (step S50) at which the originating signal is sent to the local switch 105 is the same as that in FIG. 3.

Upon reception of the terminating station dial number 51, which is designated as a terminating station by the mobile station 101a, from the mobile station controller 103 (step S50), the local switch 105 analyzes the MS dial number 12 designated as a terminating station to check whether the number can be used to perform call connection. If the local switch 105 determines, after this analysis, that the number is invalid, the local switch 105 sends a release signal to the mobile station controller 103 (step S60), and notifies that the originating request from the mobile station 101a is invalid. This release signal is relayed by the base station 102a and sent to the mobile station 101a (steps S61 and S62).

In this sequence, the mobile station controller 103 can inhibit an originating operation of the mobile station 101a through the local switch 105 without checking a terminating station dial number designated by the mobile station 101a.

Figure 8:
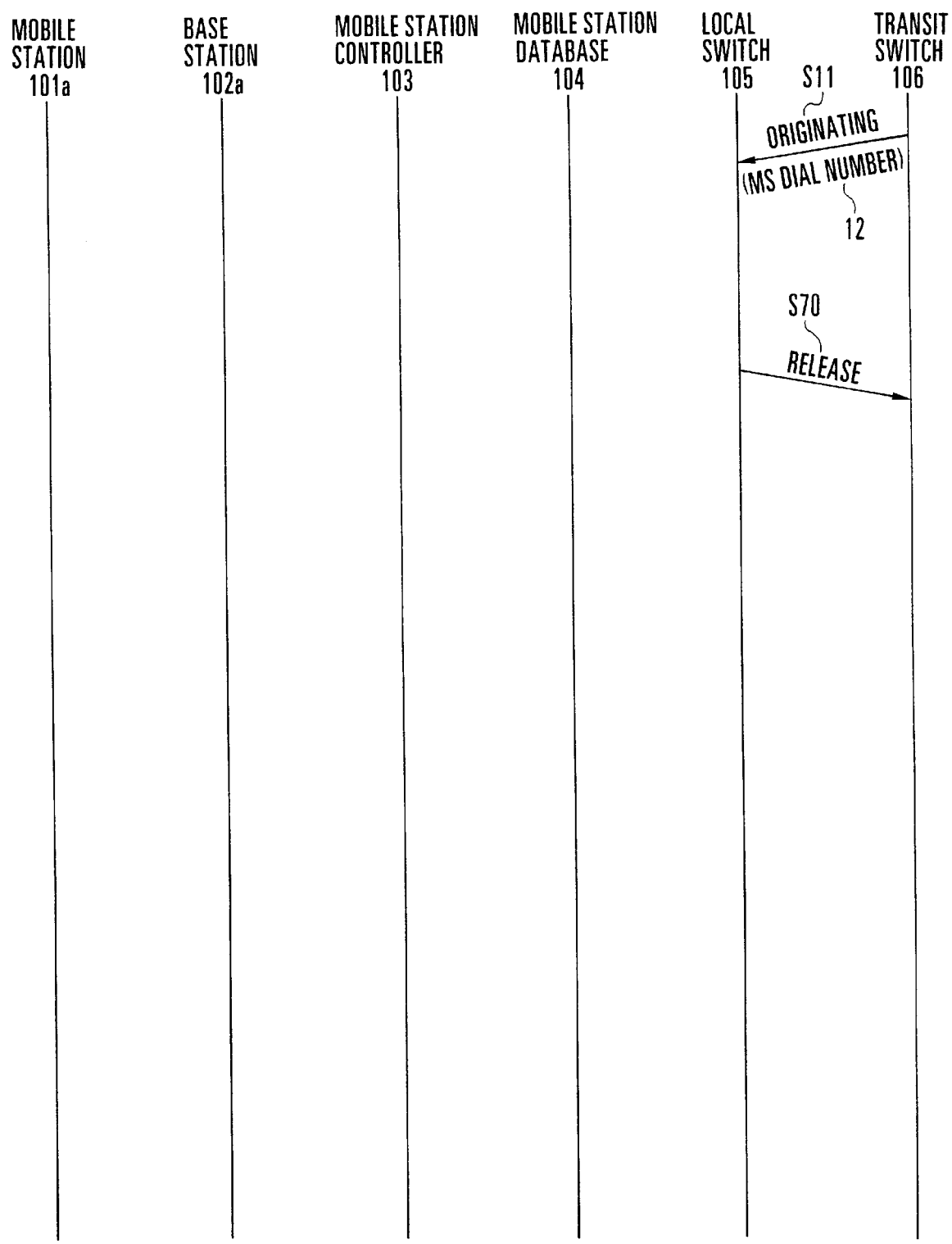
FIG. 8 is a chart showing a terminating sequence in which a terminating operation for a mobile station is inhibited in the mobile communication system in FIG. 1A.

FIG. 8 shows a connection sequence in which a terminating call is sent to the mobile station 101a, while the mobile station 101a is temporarily set in an inhibited state in the mobile communication system in FIG. 1A.

Referring to FIG. 8, when the mobile station 101a receives a terminating call from the public telephone network 109, the transit switch 106 sends a start signal to the local switch 105 by using the MS dial number 12 as a parameter (step S11). The local switch 105 determines subscriber data (not shown) from the local switch 105 by using the MS dial number 12. If it is determined that the terminating call cannot be connected, the local switch 105 sends a release signal to the transit switch 106 to notify the release of the call (step S70).

In this sequence, the mobile station controller 103 need not check whether a terminating call can be connected to the mobile station 101a. In addition, no signal is sent to the local switch 105.

Figure 9:
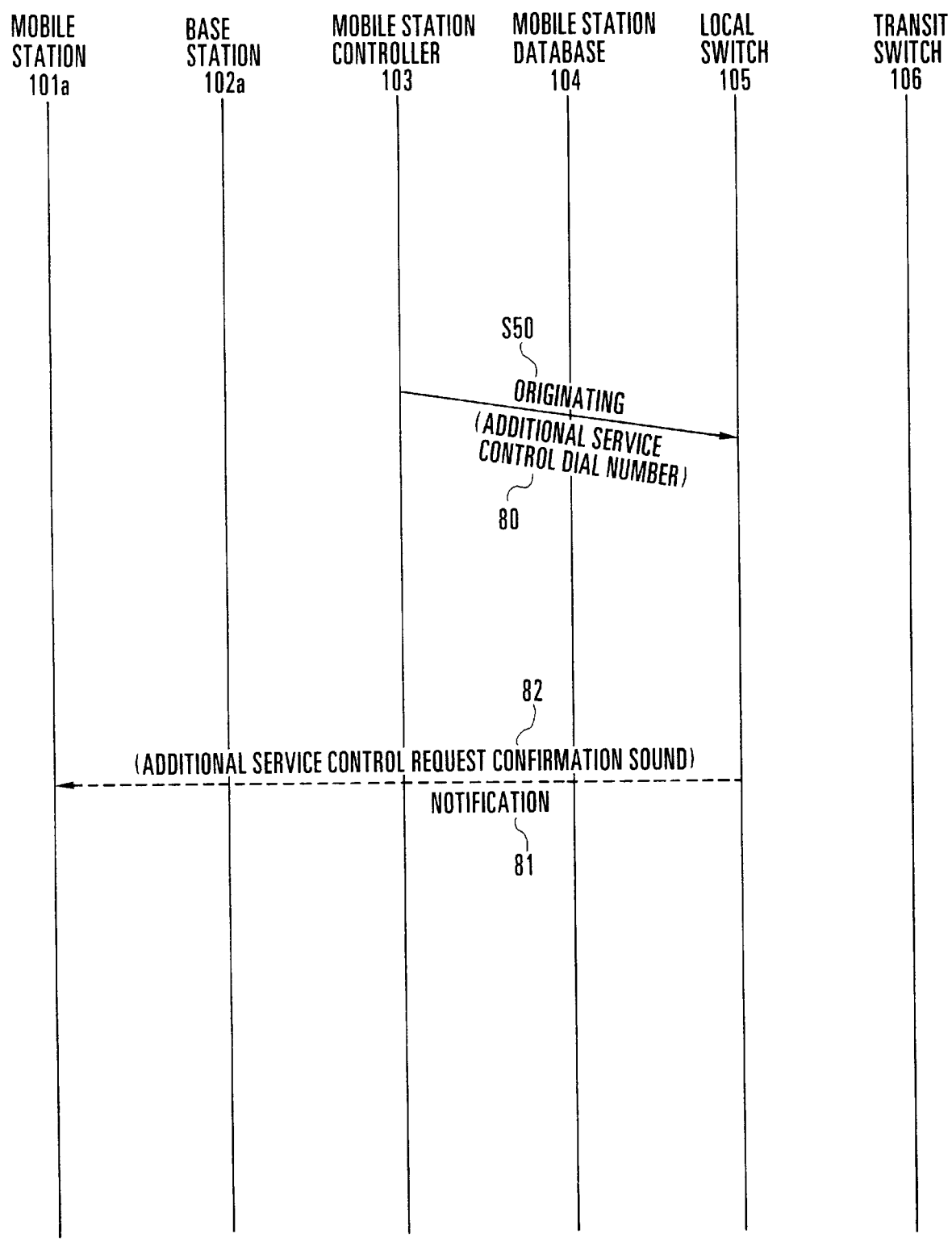
FIG. 9 is a chart showing a connection sequence in which, for example, a mobile station registers or cancels an additional service function in the mobile communication system in FIG. 1A.
Figure 10:
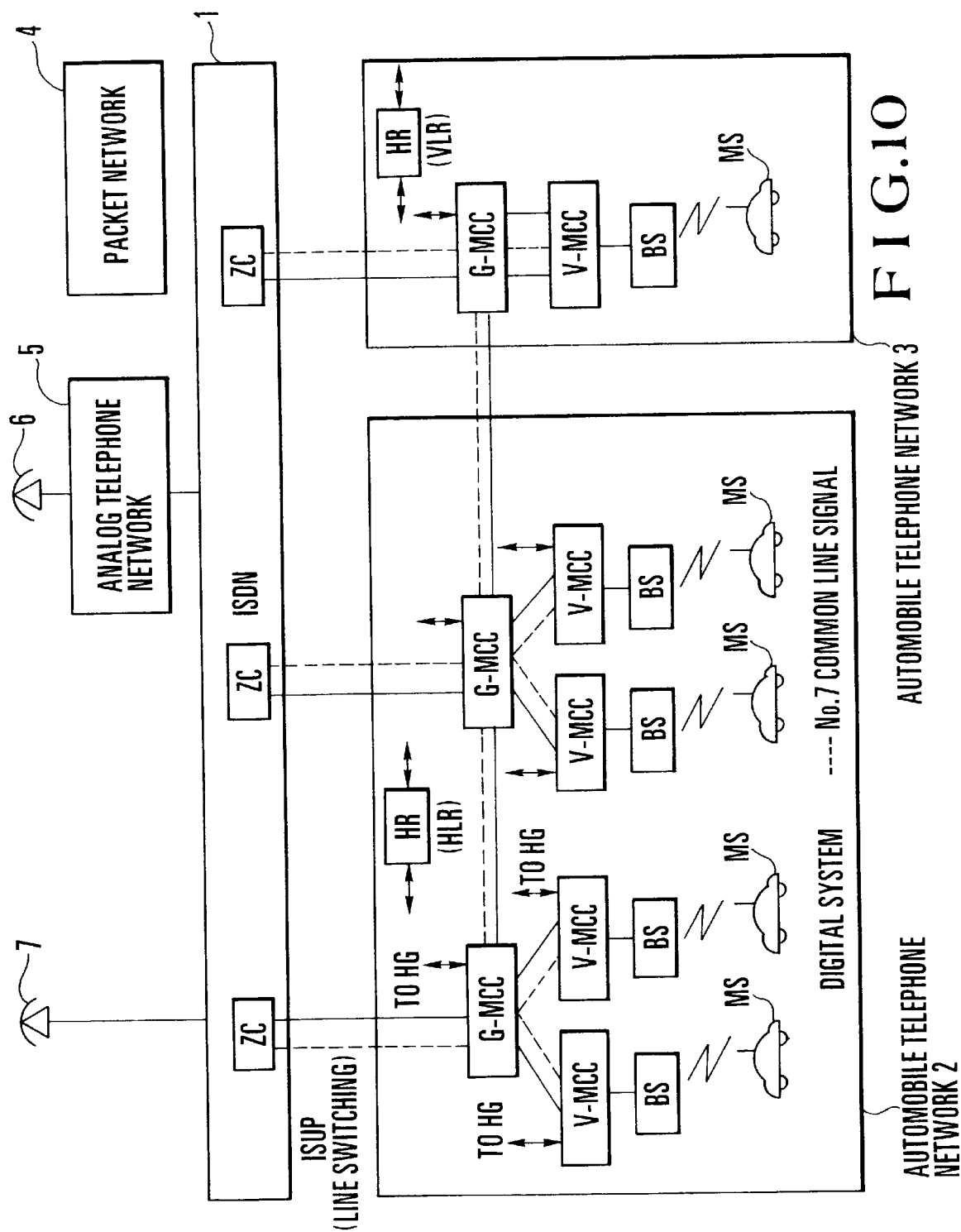
FIG. 10 is a block diagram showing a conventional system in which a call connection unit for a mobile station is connected to a unit of a rank equivalent to that of a transit switch.
Figure 11:
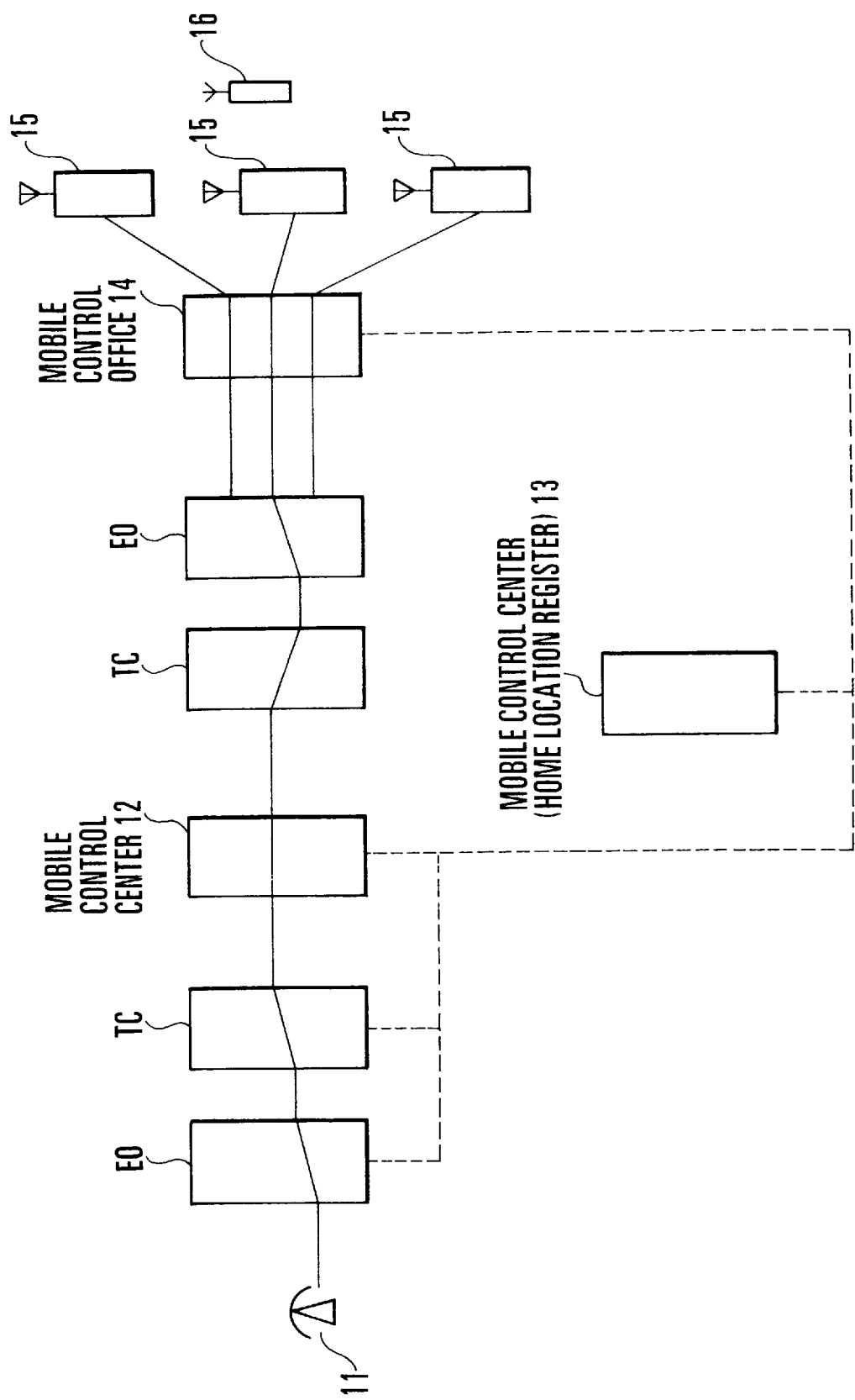
FIG. 11 is a block diagram showing a conventional system in which a call connection unit for a mobile station is connected to a unit of a rank equivalent to that of a local switch.

FIG. 9 shows a connection sequence in which, for example, a mobile station additional service function is registered or canceled in the mobile communication system in FIG. 1A.

Referring to FIG. 9, the sequence between the instant at which the mobile station 101a sends an originating signal to the base station 102a and the instant at which the originating signal is sent to the local switch 105 is the same as that in FIG. 3. Assume that the mobile station 101a has set an additional service control dial number. Upon reception of an originating signal containing an additional service control dial number 80 set by the mobile station 101a from the mobile station controller 103 (step S50), the local switch 105 analyzes the dial number to recognize that the number is an additional service control dial number. The local switch 105 performs registration, cancellation, or the like of an additional service associated with the mobile station 101a in accordance with the value of the additional service control dial number 80. In addition, the local switch 105 notifies the mobile station 101a that the additional service control request from the mobile station 101a, i.e., registration, cancellation, or the like of the additional service function, is accepted or not accepted (step S81). This notification is performed by sending an audio signal to the mobile station 101a, i.e., generating an additional service control request confirmation sound 82.

As has been described above, according to the present invention, the mobile station controller is connected, as a unit of a lower rank, to the local switch through the same interface as that used for a fixed telephone set, and subscriber lines between the mobile station controller and the public local switch are differently related to the respective mobile stations. With this arrangement, general call connection processing for a mobile station and call connection processing which can be determined and controlled by the local switch can be realized by the local switch. As a result, the mobile station controller need not perform many of the above call connection processing operations, and hence the call connection processing function of the local switch can be used.

What is claimed is:

1. A mobile communication method comprising the steps of:

when a terminating call to a mobile station accessible in a mobile communication network is generated, activating a local switch by a transit switch, and capturing one of subscriber lines which is connected to said local switch and assigned to said mobile station, the step of capturing being performed by said local switch which is communicatively connected to a mobile station controller in said mobile communication network;

retrieving a mobile station identification number defined in correspondence with the captured subscriber line by using one of a physical and logical address of the captured subscriber line as a parameter, the step of retrieving being accomplished by referring to a mobile station database communicatively connected to said mobile communication network. the step of retrieving occurring after said local switch has been activated by said transit switch and not beforehand;

calling said mobile station through at least one base station by using the retrieved mobile station identification number; and connecting the terminating call to said mobile station in accordance with a response from said mobile station with respect to calling.

2. A method according to claim 1, wherein the step of retrieving a mobile station identification number comprises the step of inquiring said mobile station database by using the one of the physical and logical address of the captured subscriber line as a parameter, and the step of retrieving a mobile station identification number corresponding to the subscriber line about which the inquiry is made in said mobile station database.

3. A method according to claim 1, further comprising the step of retrieving a simultaneous paging area number indicating a simultaneous paging area where said mobile station is present by using the retrieved mobile station identification number as a parameter, and wherein the step of calling said mobile station comprises the step of calling said mobile station through said base station in the simultaneous paging area by using the retrieved simultaneous paging area number and the mobile station identification number.

4. A method according to claim 3, wherein the step of retrieving a simultaneous paging area number comprises the step of inquiring said mobile station database by using the retrieved mobile station identification number as a parameter, and the step of retrieving a simultaneous paging area number corresponding to the mobile station identification number about which the inquiry is made in said mobile station database.

5. A method according to claim 1, further comprising the steps of:

when an originating request is generated by said mobile station through said base station, retrieving the one of the physical and logical address of the subscriber line defined in correspondence with said mobile station by using the mobile station identification number from said mobile station as a parameter;

selecting one of the subscriber lines by using the retrieved one of the physical and local address of the subscriber line and starting said local switch; and performing call connection between said mobile station and a terminating station through said local switch.

6. A mobile communication system comprising:

a mobile station;

a plurality of base stations for performing call connection to said mobile station by radio signal;

a local switch for, when a terminating call to said mobile station is generated, capturing a subscriber line assigned to said mobile station, and connecting the terminating call to said mobile station in accordance with a response from said mobile station with respect to the terminating call;

a transit switch for providing a connection from a first network to said local switch, said transmit switch activating said local switch when the terminating call is received by said transit switch and is determined to have a destination device on a second network accessible through said local switch, said second network including a mobile communications network;

a mobile station controller connected to said local switch via at least one subscriber line; and a mobile station database connected to said mobile station controller, said mobile station controller including first memory means for storing one of a physical and logical address of said mobile station and a mobile station identification number defined in correspondence with the subscriber line as a pair of data, and response means for, when receiving an inquiry from said mobile station controller with the one of the physical and logical address of the subscriber line being used as a parameter, responding with a mobile station identification number by referring to said first memory means, said referring to said first memory means only being performed after said local switch has been activated by said transit switch.

wherein said mobile station controller includes first reception means for, when the subscriber line is captured by said local switch, notifying said mobile station database of the one of the physical and logical address of the subscriber line, and receiving the mobile station identification number retrieved from said first memory means, and terminating connection means for calling said mobile station through not less than one base station by using the received mobile station identification number, and connecting the terminating call to said mobile station.

7. A system according to claim 6, wherein said mobile station database comprises second memory means for storing a simultaneous paging area number indicating a simultaneous paging area where said mobile station is present, and the mobile station identification number as a pair of data, and wherein said reception means receives the simultaneous paging area number of said mobile station which is retrieved from said second memory means by using the mobile station identification number as a parameter, and said terminating connection means calls said mobile station through said base station in the simultaneous paging area by using the received simultaneous paging area number and the mobile station identification number.

8. A system according to claim 6, wherein said mobile station controller comprises second reception means for, when an originating request is generated by said mobile station through said base station, notifying said mobile station database of the mobile station identification number from said mobile station, and receiving the one of the physical and logical address of the subscriber line which is retrieved from said first memory means, and call connection means for selecting the subscriber line by using the one of the physical and logical address of the subscriber line which is sent from said second reception means, starting said local switch, and performing call connection between said mobile station and a terminating station.

9. A system according to claim 8, wherein said first memory means comprises a first table from which a mobile station identification number is read out by using a subscriber line number as a parameter, and a second table from which a subscriber line number is read out by using a mobile station identification number as a parameter, and wherein said response means selects one of said first and second tables in accordance with a parameter of an inquiry from said mobile station controller.

10. A system according to claim 6, wherein said mobile station controller performs an originating connection operation in the same procedure as that for an originating connection operation performed by a fixed telephone set connected to said local switch when said mobile station generates an originating call, and performs a terminating connection operation in the same procedure as that for a terminating connection operation for a fixed telephone set connected to said local switch when a terminating call is sent from said local switch to said mobile station.

11. A system according to claim 6, wherein when said mobile station is to register and cancel an additional service function, said mobile station controller registers and cancels an additional service in the same procedure as that in which a fixed telephone set connected to said local switch registers and cancels an additional service function.

12. A system according to claim 6, wherein said local switch selects the subscriber line on the basis of a mobile station dial number from an originating station when said local switch is started by a terminating call to said mobile station.

13. A system according to claim 6, wherein a dial number, with which said mobile station controller identifies a terminating station in said mobile station database when the terminating call is generated, is identical to a dial number which is used by said local switch, said local switch being activated by said transit switch for connecting a call to said terminating station.

14. A method according to claim 1, wherein said mobile station database is only connected to said mobile station controller, and is not connected to said transit switch.

15. A system according to claim 6, wherein said mobile station database is only connected to said mobile station controller, and is not connected to said transit switch.

16. A method of routing a call to a mobile station on a mobile communications network controlled by a mobile station controller, the call originating from an originating station on another network, the another network being connected to the mobile communications network via a transit switch that connects to a local switch, the local switch being connected to said mobile station controller via a plurality of lines, the method comprising the steps of:

receiving, by the transit switch from the another network, a call request for a call to be made from the originating station to the mobile station as a destination station, the call request including a dial number of the destination station;

selecting and activating, by the transit switch, the local switch which will carry the call to the mobile communications network based on the dial number of the destination station, and providing the dial number to the local switch;

selecting and activating, by the local switch, one of the plurality of lines for connection to the mobile station controller based on the dial number;

retrieving, by the mobile station controller from a mobile station database only accessible by the mobile station controller, an identification number corresponding to a particular mobile station that utilizes the selected one line for calls, the identification number being retrieved based on the dial number; and sending, by the mobile station controller, a paging signal to the particular mobile station by including the identification number corresponding to the particular mobile station in the paging signal, wherein the transit switch identifies and activates the local switch based only on the dial number.

17. A method according to claim 16, wherein the dial number used by the local switch to connect to the selected one line is identical to a dial number used to retrieve the identification number of the particular mobile station.

* * * * *